United States Patent
Wadle et al.

(10) Patent No.: US 6,853,467 B2
(45) Date of Patent: Feb. 8, 2005

(54) MULTISTAGE SCREENING WITH SCREENS OF ANY DESIRED SCREEN RESOLUTIONS AND SCREEN ANGLES

(75) Inventors: Heinrich Wadle, Neumünster (DE); Ludo Kerz, Nieder-Olm (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 69 days.

(21) Appl. No.: 10/291,014

(22) Filed: Nov. 8, 2002

(65) Prior Publication Data

US 2003/0053100 A1 Mar. 20, 2003

Related U.S. Application Data

(63) Continuation of application No. PCT/DE01/01646, filed on May 2, 2001.

(30) Foreign Application Priority Data

May 8, 2000 (DE) .......................................... 100 22 225

(51) Int. Cl.$^7$ ............................ H04N 1/405; H04N 1/52
(52) U.S. Cl. ...................... 358/1.9; 358/3.13; 358/3.14; 358/3.19; 358/536
(58) Field of Search .............................. 358/3.19, 3.13, 358/3.14, 3.09, 3.1, 3.11, 3.12, 3.06, 1.9, 536, 535, 534, 533, 326; 382/270

(56) References Cited

U.S. PATENT DOCUMENTS

| | | | |
|---|---|---|---|
| 4,447,833 A | | 5/1984 | Sano et al. |
| 4,495,522 A | * | 1/1985 | Matsunawa et al. ....... 358/3.14 |
| 4,499,489 A | | 2/1985 | Gall et al. |
| 4,985,779 A | | 1/1991 | Gall |
| 5,150,428 A | * | 9/1992 | Leone et al. ............... 358/3.19 |
| 5,235,435 A | | 8/1993 | Schiller |
| 5,315,407 A | | 5/1994 | Sakamoto et al. |
| 5,353,128 A | | 10/1994 | Schielke |
| 5,394,252 A | | 2/1995 | Holladay et al. |
| 5,642,436 A | | 6/1997 | Kerz |
| 6,687,021 B1 | * | 2/2004 | Kerz ......................... 358/3.13 |

FOREIGN PATENT DOCUMENTS

| | | |
|---|---|---|
| DE | 28 27 596 C2 | 2/1980 |
| DE | 35 43 262 C2 | 6/1986 |
| DE | 690 25 706 T2 | 5/1991 |
| DE | 690 23 914 T2 | 7/1992 |
| DE | 41 08 253 C2 | 9/1992 |
| DE | 695 12 290 T2 | 9/1995 |
| DE | 197 22 697 A1 | 12/1998 |
| EP | 0 539 397 B1 | 8/1995 |
| EP | 0 740 459 A2 | 10/1996 |
| EP | 0 598 104 B1 | 4/1999 |
| GB | 2 026 283 A | 1/1980 |
| GB | 2 169 171 A | 7/1986 |
| WO | WO 90/06033 | 5/1990 |
| WO | WO 93/26116 | 12/1993 |
| WO | WO 98/54889 | 12/1998 |

* cited by examiner

Primary Examiner—Scott A. Rogers
(74) Attorney, Agent, or Firm—Laurence A. Greenberg; Werner H. Stemer; Ralph E. Locher

(57) ABSTRACT

A method for performing a digital multistage screening of a continuous-tone image with a screen having any desired screen resolution and any desired screen angle, in which the screening is carried out by reading out threshold values and comparing the threshold values read out with the color values of the continuous-tone image. Threshold value matrices are used in which the threshold values represent one or more screen dots of a given screen, with which the desired screen resolution and the desired angle are approximated. While the threshold values are being read out, an error between the coordinates of the desired screen and of the given screen is determined, and the error is compensated for by correcting the read address for the threshold value matrix, as soon as the error exceeds a predefined limiting value. Instead of the threshold value matrices, printing-value matrices can also be used.

10 Claims, 8 Drawing Sheets

FIG. 4, Sheet 1

```
10      yaoffset  =  0
20      yboffset  =  0
30      yaerr     =  0
40      yberr     =  0

60      repeat for all rows with y=1...n
70          xaoffset = yaoffset
80          xboffset = yboffset
90          xaerr = yaerr
100         xberr = yberr 110         repeat for all pixels of a row with x=0...m
120             tmp = threshold access (x+xaoffset, y+xboffset)

140             compare tmp with external ink value signal
150             and make the pixel x, y dependent upon the
160             comparison result 180             xaerr = xaerr + dxa
190             xberr = xberr + dxb 200             if (xaerr < -1)
210                 xaoffset=xaoffset-1
220                 xaerr = xaerr+1

230             if (xaerr > 1)
240                 xaoffset=xaoffset+1
250                 xaerr = xaerr-1

260             if (xberr < -1)
270                 xboffset=xboffset-1
280                 xberr = xberr+1

290             if (xberr > 1)
300                 xboffset=xboffset+1
310                 xberr = xberr-1
320         end repetition for x 340     yaerr = yaerr + dya
350     yberr + dyb
```

FIG. 4, Sheet 2

```
370         if (yaerr < -1)
380             yaoffset=yaoffset-1
390             yaerr = yaerr+1

400         if (yaerr > 1)
410             yaoffset=yaoffset+1
420             yaerr = yaerr-1

430         if (yberr < -1)
440             yboffset=yboffset-1
450             yberr = yberr+1

460         if (yberr > 1)
470             yboffset=yboffset+1
480             yberr=yberr-1
490     end repetition y
```

| 0 | 0 | 11 | 3 | 0 | 1 | 12 | 0 | 0 | 7 | 8 |
|---|---|---|---|---|---|---|---|---|---|---|
| 1 | 3 | 14 | 8 | 0 | 8 | 15 | 4 | 0 | 12 | 13 |
| 6 | 10 | 15 | 15 | 2 | 15 | 15 | 11 | 6 | 15 | 15 |
| 0 | 2 | 14 | 8 | 0 | 7 | 15 | 3 | 0 | 11 | 12 |
| 0 | 0 | 12 | 2 | 0 | 1 | 12 | 0 | 0 | 6 | 8 |
| 3 | 6 | 15 | 12 | 0 | 11 | 15 | 7 | 3 | 14 | 14 |
| 5 | 8 | 15 | 14 | 2 | 14 | 15 | 9 | 5 | 15 | 15 |
| 0 | 0 | 13 | 4 | 0 | 3 | 14 | 1 | 0 | 8 | 9 |
| 0 | 1 | 13 | 6 | 0 | 4 | 14 | 1 | 0 | 9 | 10 |
| 6 | 9 | 15 | 14 | 3 | 14 | 15 | 10 | 5 | 15 | 15 |
| 3 | 6 | 15 | 11 | 0 | 10 | 15 | 7 | 2 | 14 | 14 |

FIG. 7

MULTISTAGE SCREENING WITH SCREENS OF ANY DESIRED SCREEN RESOLUTIONS AND SCREEN ANGLES

CROSS-REFERENCE TO RELATED APPLICATION

This application is a continuation of copending International Application No. PCT/DE01/01646, filed May 2, 2001, which designated the United States and was not published in English.

BACKGROUND OF THE INVENTION

FIELD OF THE INVENTION

The invention pertains to the field of electronic reproduction technology and relates to a method of producing screened images with screens of any desired screen resolutions and screen angles.

In most printing processes, only a few printing-value gradations can be printed. Many printing processes can even reproduce only two printing values—either ink is applied to the printing material or ink is not applied to the printing material. Other printing processes are able to produce only a few coarsely gradated printing values, for example only 16 printing values. In order to simulate a finely gradated tonal value scale in the printed result, which the eye senses as continuous, screen dots arranged one beside another in the form of a grid are therefore printed. By varying the size of the screen dots, a lighter or darker tonal value is optically produced. The spacing of the screen dots from one another is designated as the screen resolution, and the angle of the screen dot grid to the x-axis is designated as the screen angle. For four-color printing with the printing inks cyan, magenta, yellow, and black (CMYK), operations are usually carried out with four screens with the same screen resolution and the screen angles 0, 15, 45 and 75 degrees, in order to minimize Moiré patterns. Even minimum deviations from this cause Moiré patterns, and therefore poor or unusable image reproductions.

Screening is used during the production of printing originals, that is to say, during the exposure of color separation films or during the direct exposure of printing plates, or in a black/white or color printer whose resolution is sufficiently high to be able to print screen dots of varying size. In the prior art, screened printing originals are produced with exposers that operate digitally. These exposers use a light source in order to expose a light-sensitive surface, for example, a film or a printing plate. This light source can be moved step by step relative to the printing original in the x and y direction and can be specifically switched on and off. In this case, the result is small area elements, also called "device pixels", which will or will not be exposed individually, depending on the control of the light source. Screen dots in these digital exposers are built up from a large number of device pixels. In a computing unit connected upstream, also called an RIP (Raster Image Processor), each device pixel is represented by a bit in a memory. The aggregate of all of these bits is designated as a bit map and is a digital image of the device pixels.

In the past, a series of methods for digital screening have been disclosed, and these methods may be divided into three groups, so-called irrational screening methods (referred to as the IS, IS method or IS technique below), so-called rational screening methods (referred to as the RT, RT method or RT technique below) and frequency-modulated screening methods. The nomenclature is explained by the fact that, in the irrational screening methods, screen angles with an irrational tangent are used, and in the rational screening methods, screen angles with a rational tangent are used. An irrational screening method is described, for example, in Issued German Patent DE 28 27 596 C2, and rational screening methods are described in Issued German Patent DE 28 27 596 C2 and in Issued European Patent EP 0 539 397 B1.

The common factor in both of these screening methods is that a digital image of the screen dots exists in the memory of the RIP, and is also called a "threshold value range" or a "threshold value matrix". In this connection, the term "threshold value memory" is also used. This image includes a group of numerical values, the threshold values, as they are known. The digital printing originals are produced using a screening operation or screening, in which for each device pixel, in accordance with a stipulation that depends on the screening method, a threshold value is selected from the threshold value range and is compared with a digital color signal associated with the device pixel. On the basis of this comparison, the relevant bit in the bit map is either set or is not set, and therefore the associated device pixel of the exposer is also either blackened or is not blackened. The digital color signal is usually obtained by scanning an original or is read out from a memory. The procedure of determining the threshold value that is associated with a device pixel is also called threshold value access.

In the IS method, the threshold value memory includes the digital image of a single screen dot, which is stored at an angle of 0 degrees. During screening, a complex computing procedure has to be carried out for each device pixel for each threshold value access. In this case, both the screen resolution and the screen angle, also designated by using only the term "screen" below, have to be taken into account.

In the RT method, the threshold value memory includes the digital image of one or more screen dots. When the threshold values are stored in the memory, the screen resolution and screen angle have already been taken into account, and the threshold values in the memory are organized in such a way that the threshold values of adjacent device pixels are also adjacent in the threshold value memory. The computing operation during a threshold value access is therefore substantially reduced to address indexing.

The two methods have a completely different technical implementation with regard to the method sequence for producing the screen. On the other hand, the two methods have different technical advantages and disadvantages, for which reason, sometimes one screening method and sometimes the other screening method is favored in practice. Since, in the IS method, only a single screen dot is stored in the threshold value memory, there is a far lower requirement for storage space. Furthermore, the computing operation for selecting the threshold values permits the exact implementation of all screens, in particular, including the irrational angles 15 and 75 degrees which are important for color printing. By contrast, the RT methods can approximate the required screen angles only with values that can be described by a rational tangent, and the storage space requirement for threshold values increases approximately as the square of the accuracy.

The advantage of the RT method is that the screening operation can be implemented both in hardware and in software with a lower outlay and with better performance. The IS methods come off particularly poorly when implemented in software. This applies in particular when large areas with a uniform area coverage level have to be screened. Here, for the RT method, a bit pattern corresponding to the area coverage level can be produced in advance, and it then only has to be copied. By contrast, for the IS method, the associated threshold value access, in principle, has to be calculated separately for each device pixel that will be screened. Furthermore, in the RT method, it is not necessary to add noise. In the IS method, noise is generally added in order to hide interfering-patterns which are produced in this method. In practice, this leads to screen dots with torn edges, which has a detrimental effect in printing terms. Furthermore, in large areas with constant area coverage, the noise manifests itself in the reproduced image in the form of an optical instability.

U.S. Pat. No. 5,315,407 describes an improvement to the IS method, with which the instability that is produced by the somewhat different shape of the adjacent screen dots will be reduced. To this end, the coordinates for addressing the threshold value matrix are modified in such a way that the center of each screen dot is shifted onto the respective nearest device pixel. As a result, the screen dots are given a more uniform shape. However, even this method has the fundamental disadvantage of the IS method in that, for each device pixel that will be screened, a complex calculation of the addresses for the threshold value access has to be carried out.

In published German Patent Application DE 197 22 697 A1, a screening process is described that combines the advantages of the IS method and of the RT method with one another. To this end, a threshold value matrix is used in which the threshold values represent one or more screen dots of a given RT screen, with which the screen resolution and the screen angle of a desired IS screen are approximated. When the threshold values are read out, an error between the coordinates of the desired IS screen and of the given RT screen is determined, and when the error exceeds a predefined limiting value, the error is compensated for by correcting the read address for the threshold value matrix. In this way, the desired IS screen is produced without calculating the complex and time-consuming threshold value matrix address that is calculated in the normal IS method. Alternatively, instead of the threshold value matrix, stored bit patterns can be used, which have been obtained by comparing the color values that will be reproduced with a threshold value matrix.

The combined IS/RT method is described in German Patent Application DE 197 22 697 A1 for producing a screened reproduction with only two printing values—that is to say, for the case in which each device pixel can only either accept or not accept ink on the recording material. On the other hand, RT screening methods are known which are suitable for multistage printing processes—that is to say, for printing processes that can reproduce a small number of coarsely gradated printing values on the recording material. Such a process is described in Published European Patent Application EP 0 598 104. Each screen dot includes a maximum of 4×4 device pixels, and each device pixel can assume 8 different printing values. For simulating an increasing value on the finely gradated tonal value scale, the printing values in a device pixel are initially increased until a maximum tonal value stage has been reached. Only then is the screen dot enlarged by further device pixels, in order to simulate even darker stages of the tonal value scale. The screen in described only for an angle of zero degrees.

In Published European Patent Application EP 0 740 459 A2, rational screening for a multistage printing process is described, in which a plurality of sets of threshold value matrices are provided. The number of threshold value matrices in each set is equal to the number of printing-value stages available. The sets of threshold value matrices differ with respect to the change in the screen dot shape and the printing-value stages in a screen dot with increasing color values of the image points that will be screened. For image points in an image, a threshold value set is selected that produces pronounced, isolated screen dots. For image points at a sharp edge, for example, at the edge of a script, a threshold value set is selected which, even at relatively small and medium color values, produces screen dots that merge into one another. As a result, the sawtooth effect at sharp edges is reduced. By using an edge filter, the edge sharpness of image regions is distinguished, and a suitable set of threshold value matrices is selected for the screening.

SUMMARY OF THE INVENTION

It is accordingly an object of the invention to provide a screening method that overcomes the above-mentioned disadvantages of the prior art methods of this general type.

In particular, it is an object of the present invention to provide a screening method that improves and expands the combined IS/RT method described in Published German Patent Application DE 197 22 697 $\mu l$ such that method is suitable for producing multistage screening.

The object of the invention is obtained by: applying the address calculation of the combined IS/RT method to a plurality of threshold value matrices; comparing the read-out threshold values with the color value of the image signal; and using the comparison results to determine which of the available printing values will be printed for the relevant device pixel. In an alternative solution, the address calculation of the combined IS/RT method is applied to printing-value matrices that directly contain printing values that will be printed for each color value of the image.

With the foregoing and other objects in view there is also provided, in accordance with the invention, a method for digitally screening a continuous-tone image with a first screen having any desired screen resolution and any desired screen angle. The method includes steps of: assigning a first coordinate system having x,y addresses to the first screen; assigning a second coordinate system having x,y addresses to a second screen having a given screen resolution and a given screen angle; storing a plurality of threshold values of the second screen in a plurality of threshold value matrices, a number of the plurality of the threshold value matrices being equal to a number of printing values available in a multistage printing process; reading out a respective threshold value for a printable device pixel from each one of the plurality of the threshold value matrices at an x, y address in the second coordinate system while determining an error between the x,y address in the second coordinate system and a corresponding x,y address in the first coordinate system; when the error exceeds a predefined limiting value, compensating for the error by correcting the x, y address in the second coordinate system used for reading out the respective threshold value from each one of the plurality of the threshold value matrices; obtaining comparison results by comparing the respective threshold value read-out from each one of the plurality of the threshold value matrices with an associated color value from the continuous-tone image; and based on the comparison results, selecting one of the plurality of the printing values for the device pixel.

With the foregoing and other objects in view there is provided, in accordance with the invention, another method for digitally screening a continuous-tone image with a first screen having any desired screen resolution and any desired screen angle. This method includes steps of: assigning a first coordinate system having x,y addresses to the first screen; assigning a second coordinate system having x,y addresses to a second screen having a given screen resolution and a given screen angle; providing printing values, representing at least one screen dot of the second screen, as printable values of a multistage printing process for device pixels associated with image points of the continuous-tone image being screened; storing the printing values in a plurality of printing-value matrices; associating each possible tonal value stage of color values with a respective one of the plurality of the printing-value matrices; for an image point, addressing each one of the plurality of the printing-value matrices with an x, y address in the second coordinate system, and then reading out a respective printing value for a device pixel associated with the image point from each one of the plurality of the printing-value matrices while determining an error between the x, y address in the second coordinate system and a corresponding x, y address in the first coordinate system; when the error exceeds a predefined limiting value, compensating for the error by correcting the x, y address in the second coordinate system used for reading out the respective printing value from each one of the plurality of the printing-value matrices; and for screening a color value associated with the image point and belonging to a respective printing value read-out, selecting a printing-value matrix associated with a tonal value stage corresponding to the color value associated with the image point.

In accordance with an added feature of the invention, random numbers are used to modify x, y addresses in the second coordinate system that have been corrected.

In accordance with an additional feature of the invention, the random numbers are added to the x, y addresses in the second coordinate system that have been corrected.

In accordance with another feature of the invention, the random numbers are used to vary locations in the second coordinate system, at which the x, y addresses in the second coordinate system are corrected.

In accordance with a further feature of the invention, before applying a new one of the random numbers, an influence of a preceding one of the random numbers is reversed.

Other features which are considered as characteristic for the invention are set forth in the appended claims.

Although the invention is illustrated and described herein as embodied in a multistage screening with screens of any desired screen resolutions and screen angles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a program fragment relating to correcting the error;

FIG. 7 shows an example of the distribution of printing values in a printing value matrix.

DESCRIPTION OF THE PREFERRED EMBODIMENTS

Figure 1:
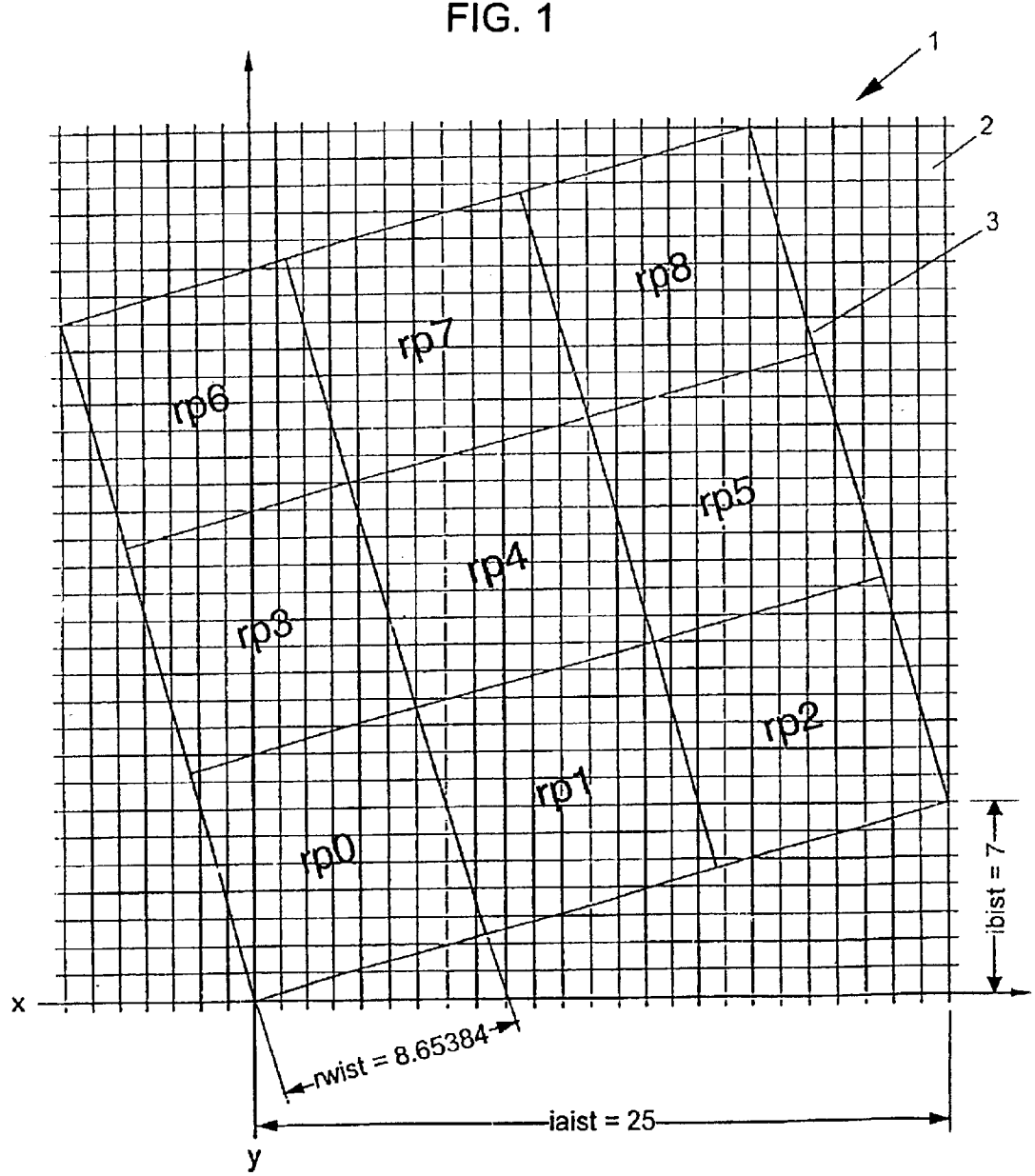
FIG. 1 shows a rational screen that is superimposed on a number of device pixels.

For a better understanding of the invention, the address calculation of the combined IS/RT method described in Published German Patent Application DE 197 22 697 A1 will first be described. FIG. 1 shows a number (1) of device pixels (2) superimposed with a rational screen (3) including 3×3 screen dots or screen-dot cells, which are designated as rp0 . . . rp8. In addition, the coordinate axes x and y of a Cartesian coordinate system are shown. The screen-dot cells rp0 . . . rp8 are repeated without gaps in the x and y direction in the manner of "tiles" and therefore cover the entire area that will be screened. The screen-dot cells rp0 . . . rp8 have a screen resolution rwist, and the rational screen (3) has an angle such that the tangent of the angle is defined by the ratio between the whole numbers ibist and iaist—that is to say, the tangent of the screen angle is a rational number.

Figure 2:
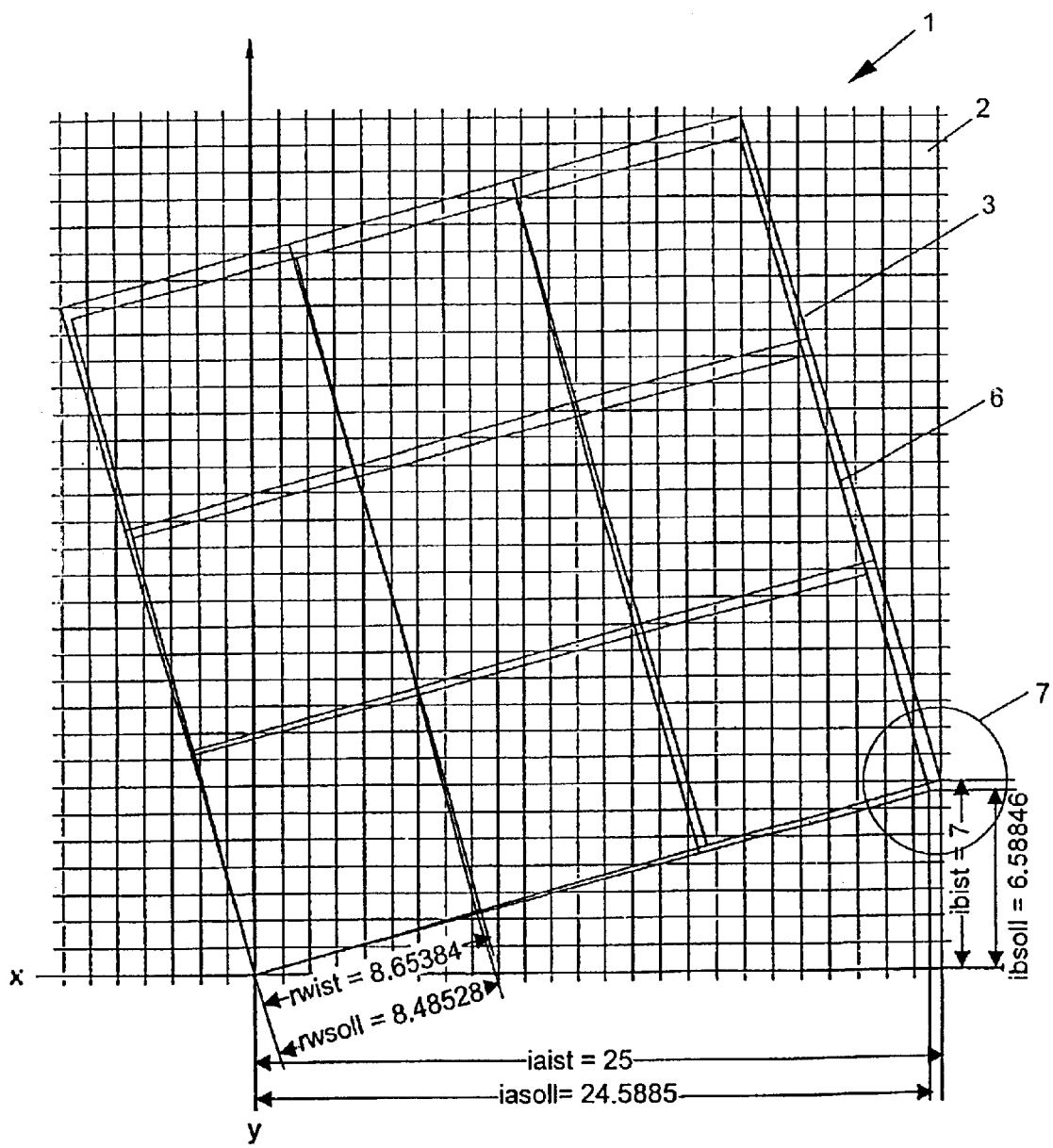
FIG. 2 shows a superimposed irrational screen that will be approximated by the rational screen.

FIG. 2 additionally shows an irrational screen (6) that will be approximated by the rational screen (3). The irrational screen (6) has a somewhat different screen resolution rwsoll and also a somewhat different irrational screen angle. The tangent of the irrational screen angle is defined by the ratio between the non-integer numbers ibsoll and iasoll.

In the following text, the address calculation will be explained in more-detail using the parameters from FIGS. 1 and 2. For example, an irrational screen (6) will be produced, as shown in FIG. 2, having the parameters:

screen resolution rwsoll=8.485282 device pixels; and screen angle αsoll=15 degrees.  (1)

It will be assumed that this screen can be approximated by a rational screen (3) having rp×rp screen dots. The rational screen is described by the following parameters:

rp=3;

iaist=25; and ibist=7.  (2)

By using a geometrical calculation, the following variables are derived (sqrt=square root, atan=arc tangent):

screen resolution $rwist=sqrt(iaist^2+ibist^2)/rp=8.653836$ device pixels;

screen angle $\alpha ist=atan(ibist/iaist)=15.642246$ degrees;

$iasoll=rp \times rwsoll \times cos(\alpha soll)=24.588461$; and $ibsoll=rp \times rwsoll \times sin(\alpha soll)=6.588457$.  (3)

From the variables iaist, ibist, iasoll, ibsoll, the magnitude and the direction of the error is calculated that results in accordance with rwist×rp device pixels at the angle αist:

$cerr=sqrt(da^2+db^2)=0.582009$ device pixels; and $\alpha err=atan(db/da)=-135$ degrees, where:  (4)

it is true that:

$$da = iasoll - iaist;\text{ and}$$

$$db = ibsoll - ibist. \quad (5)$$

Figure 3:
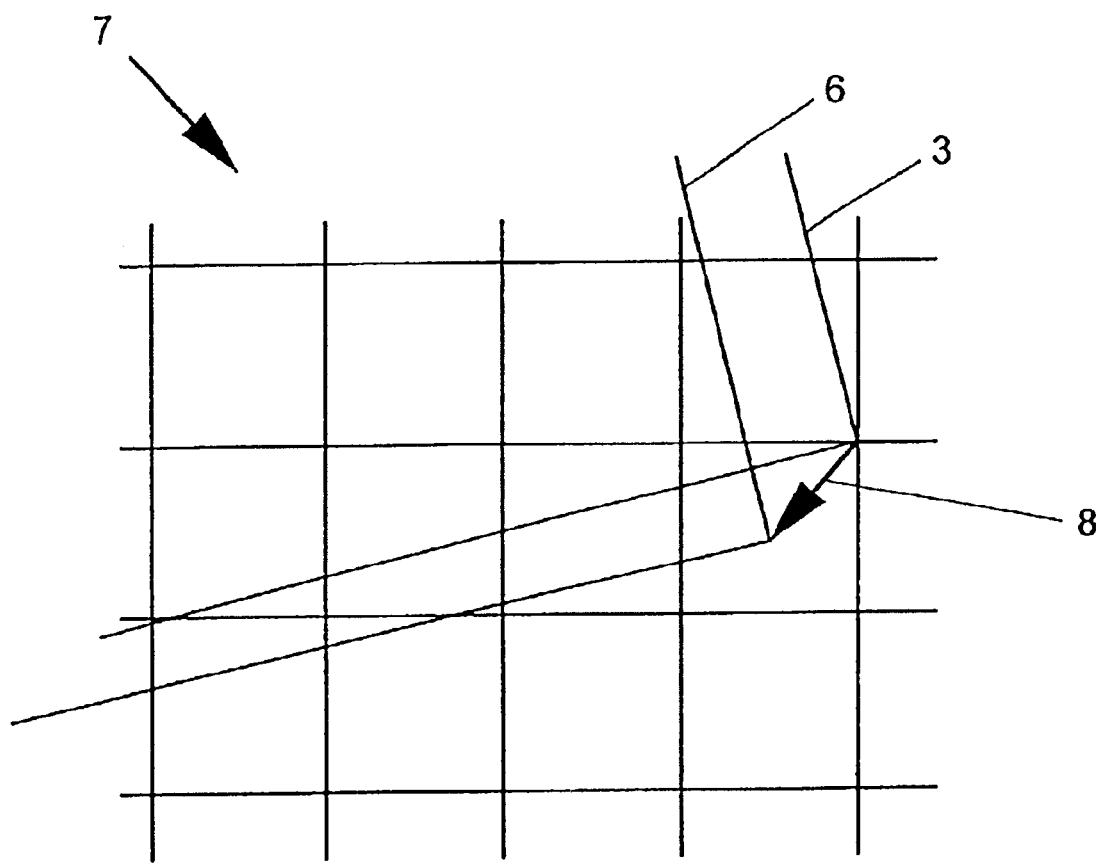
FIG. 3 is an enlarged portion from FIG. 2 showing the error between the rational screen and the irrational screen in terms of magnitude and direction.

FIG. 3 is an enlarged portion (7) obtained from FIG. 2 showing the magnitude and the direction of the error (8). Based on that, the error per device pixel when screening along the x and y axis is determined using the following equations:

$$dxa = cerr \times \cos(\alpha err - \alpha ist)/(rwist \times rp) = -0.019539;$$

$$dxb = cerr \times \sin(\alpha err - \alpha ist)/(rwist \times rp) = -0.010991;$$

$$dya = cerr \times \cos(\alpha err - \alpha ist + 90)/(rwist \times rp) = 0.010991;\text{ and}$$

$$dyb = cerr \times \sin(\alpha err - \alpha ist + 90)/(rwist \times rp) = -0.019539. \quad (6)$$

The values dxa and dxb should be understood such that, with each device pixel with which the distance from the coordinate origin increases in the x direction, the error between the desired and the actual (soil and ist) increases in the x direction by dxa device pixels and in the y direction by dxb device pixels. The values dya and dyb should be understood such that, with each device pixel by which the distance from the coordinate origin increases in the y direction, the error between the desired and the actual (soll and ist) increases in the x direction by dya device pixels and in the y direction by dyb device pixels.

For the device pixel at an arbitrary position x, y in the area, the variables dxa, dxb, dya and dyb result in an error in the reproduction of the required screen of:

$$\text{error in x direction: } erra = y \times dya + x \times dxa;\text{ and}$$

$$\text{error in y direction: } errb = y \times dyb + x \times dyb. \quad (7)$$

In accordance with the combined IS/RT method from Published German Patent Application DE 197 22 697 A1, this error is corrected continuously during screening. This is explained in a simple form by the program fragment shown in FIG. 4. The screening operation is normally carried out row by row—that is to say, first of all, all of the device pixels for y=0 and x=0 . . . m are screened, and then for y=1 and x=0 . . . m, and so on. Consequently, there are loop constructions for x and y in the program lines 60 . . . 490 and 110 . . . 320. In program line 120, using the loop counters x and y and the counters xaoffset and xboffset, which will be explained later, a threshold value access is carried out. In program lines 140 . . . 160, the threshold value determined in this way is compared with an external color value from the image signal, and as a function of this comparison, the device pixel x, y is either blackened or is not blackened. In the program lines 180 . . . 190, the error for each x-loop pass is added up in the counters xaerr and xberr. A similar procedure is carried out in the lines 340 . . . 350 for each y-loop pass. If the magnitude of the error added up in xaerr and xberr becomes greater than 1 pixel, then the error is corrected in program lines 200 . . . 310. If, for example, xaerr is less than −1, then 1 is subtracted from xaoffset. If it is assumed that xaoffset was previously equal to 0, then in all of the further x-loop passes, during the threshold value accesses in program line 120, access is no longer made to the threshold value for x, but rather to that for x−1. The actual correction is carried out in this way. In further successive x-loop passes, xaoffset becomes −2, −3 and so on, and is taken into account as a correction in the threshold value accesses. An analogous procedure is carried out in the program lines 370 . . . 480 for each y-loop pass. In program lines 70 . . . 100, before each x-loop pass, their counters are initialized with the error and correction values already predefined in the y-loop. In a manner analogous to this, the same counters are initialized to 0 in program lines 10 . . . 40, before the first y-loop pass. For further refinements to the calculation method for the addresses of the threshold value matrix, reference is made to Published German Patent Application DE 197 22 697 A1.

Figure 5:
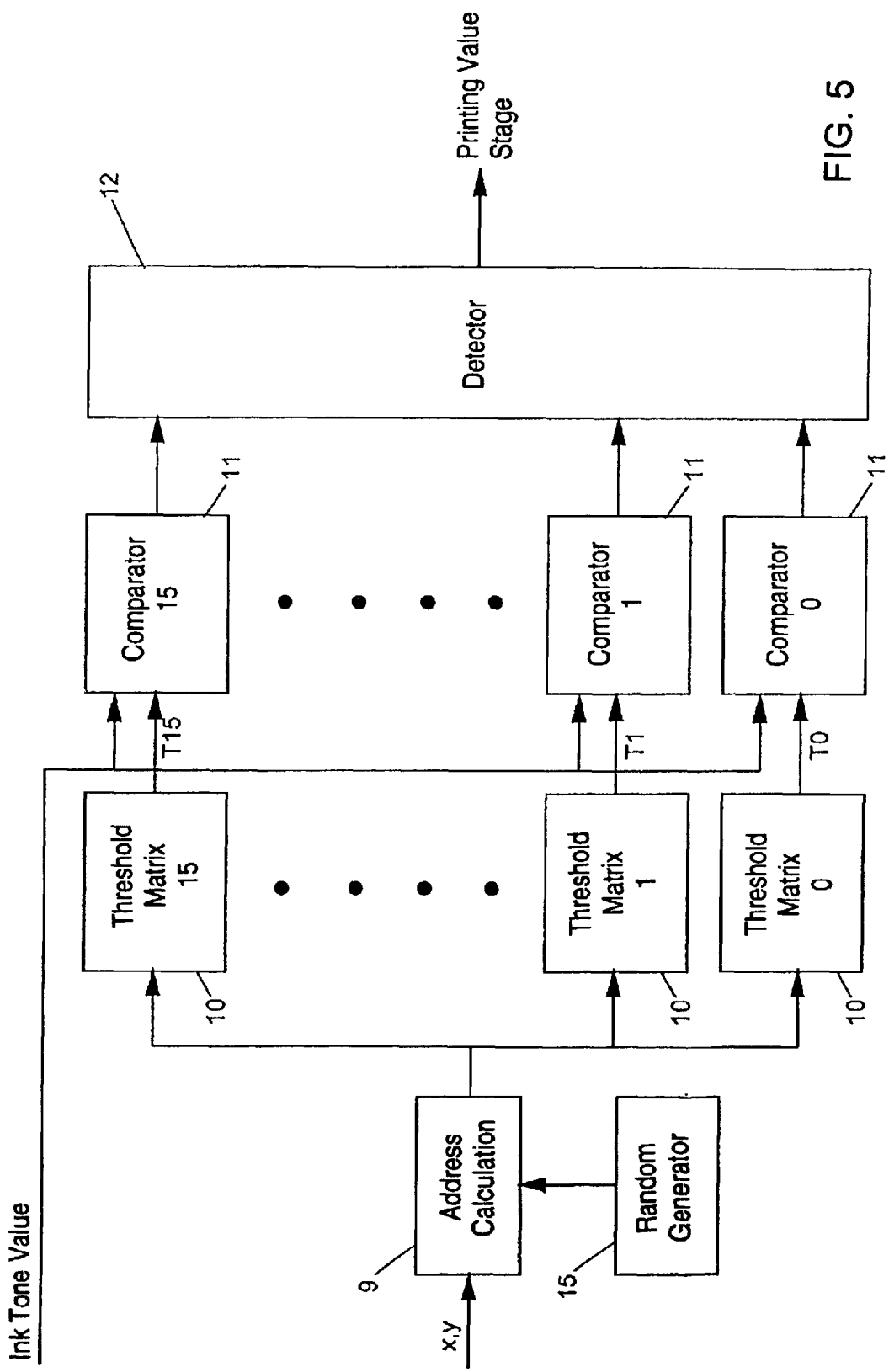
FIG. 5 is a block diagram of one embodiment of the invention.

FIG. 5 shows a block diagram of one embodiment of the invention. The x, y coordinates of the device pixel that will be processed are supplied to the address calculation (9), with which the threshold value matrix addresses are calculated in accordance with the combined IS/RT method explained above. That is to say, by using the continuous address error correction, an irrational screen is produced from a predefined rational screen. The calculated threshold value address is supplied to a plurality of threshold value matrices (10). The number of the threshold value matrices is equal to the number of printing values available. In the example shown in FIG. 5, sixteen threshold value matrices have been assumed. That is to say, the printing process is able to reproduce sixteen different printing values in each device pixel. The threshold values T0 . . . T15 read out from the threshold value matrices (10), together with the color value applicable to the device pixel and belonging to the image signal that will be screened, are each supplied to a comparator (11), which decides whether the respective threshold value is less than or greater than the color value from the image signal. These sixteen binary decisions are evaluated in the detector (12) in order to select one of the possible sixteen printing values for the device pixel.

With a suitable distribution of threshold values in the threshold value matrices (10), it is possible to achieve the situation where the threshold values T0 . . . T15 read out increase monotonically in every case. Then, for example, all of the comparators (11) in which the threshold value Tx is less; than the color value of the image signal, supply the binary decision 1, and the other comparators supply the binary decision 0. In this case, the detector (12) determines the comparator up to which the threshold value Tx is just still less than the color value of the image signal, and the number of this comparator (11) is output as the printing value.

Figure 6:
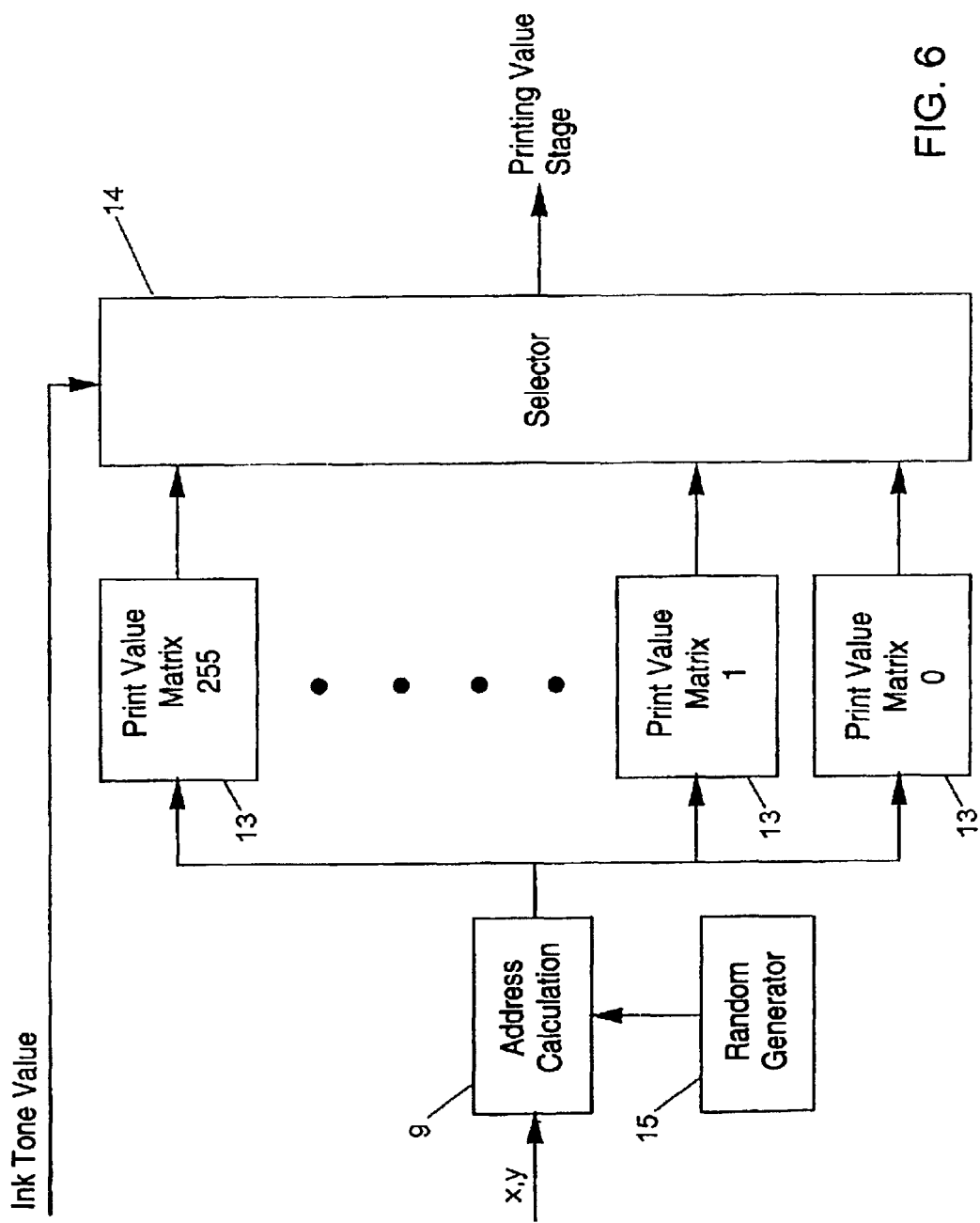
FIG. 6 is a block diagram of a modified embodiment of the invention.

FIG. 6 shows a block diagram of a modified embodiment of the invention. The x, y coordinates of the device pixel that will be processed are supplied to the address calculation (9), with which the addresses are calculated in accordance with the combined IS/RT method explained above. However, the calculated addresses are supplied to a plurality of printing-value matrices (13). The number of printing-value matrices is equal to the number of tonal value stages that are to be simulated by the screening. In the example shown in FIG. 6, 256 printing-value matrices (13) have been assumed. That is to say, the printing process can reproduce 256 different tonal value stages using the screening. A distribution of the sixteen available printing values, with which the respective tonal value stage is simulated, is stored in each of the printing-value matrices (13). The eye integrates the distribution of the printing values over a plurality of adjacent device pixels. The printing values that are read out from the printing-value matrices (13) are supplied to a selector (14). The selector (14) is controlled by the color value of the image signal in such a way that the printing-value matrix (13), whose simulated tonal value stage corresponds to the color value, is switched through to the output. FIG. 7 shows an example of the distribution of the printing values in a printing-value matrix (13), with which the tonal value stage 127 is simulated.

In order to reduce disruptive residual structures that can arise in the produced screen on the basis of inadequacies in the recording process or of the printing unit, the inventive method can be expanded further by using a unit for producing address noise. This expansion is possible in both of the embodiments described using FIG. 5 and FIG. 6. For this purpose, a random generator (15) is provided, which produces random numbers z in the generally small numeric range between −zmax and +zmax.

According to a first method relating to address noise, the random numbers are added to the x and y components of the calculated addresses for the threshold value matrices (10) and the printing-value matrices (13). The random numbers are expediently added in each case only after a specific number of k address steps in the x or y direction. In order to prevent the random values from accumulating, that is to say in order to ensure that the random deviations of the address components do not go beyond the range between −zmax and +zmax, it is expedient in each case to subtract the previously added random number z_old, before adding a new random number z_new. The calculated address components x_ber and y_ber are therefore modified by the random numbers in the following manner after k address steps in each case in the x and y direction:

$$x\_new = x\_ber + zx\_new - zx\_old; \text{ and}$$

$$y\_new = y\_ber + zy\_new - zy\_old. \quad (8)$$

Precise analysis of the address calculation using the combined IS/RT method shows that the correction to the address error between the rational screen and the irrational screen is in each case performed after a fixed number of address steps in the x and y direction (See, for example, Published German Patent Application DE 197 22 697 A1).

This can be utilized in a second method relating to address noise, which takes into account the special features of the address calculation in accordance with the IS/RT method. If, for example, the correction between the rational screen and the irrational screen is to take place regularly following sx_ber address steps in the x direction and after sy_ber address steps in the y direction, these values are varied by the random numbers. In this case, the random values are again prevented from accumulating by subtracting the previously added random number. The correction between the rational screen and the irrational screen is then carried out in accordance with the new randomly varied numbers sx_new and sy_new of the address steps:

$$sx\_new = sx\_ber + zx\_new - zx\_old; \text{ and}$$

$$sy\_new = sy\_ber + zy\_new - zy\_old. \quad (9)$$

The difference between the first method relating to address noise is that the random numbers are not added directly to the address components, but rather the locations in the x, y plane, at which the correction to the address error between the rational screen and the irrational screen is made, are varied randomly.

We claim:

1. A method for digitally screening a continuous-tone image with a first screen having any desired screen resolution and any desired screen angle, the method which comprises:

assigning a first coordinate system having x,y addresses to the first screen;

assigning a second coordinate system having x,y addresses to a second screen having a given screen resolution and a given screen angle;

storing a plurality of threshold values of the second screen in a plurality of threshold value matrices, a number of the plurality of the threshold value matrices being equal to a number of printing values available in a multistage printing process;

reading out a respective threshold value for a printable device pixel from each one of the plurality of the threshold value matrices at an x, y address in the second coordinate system while determining an error between the x,y address in the second coordinate system and a corresponding x,y address in the first coordinate system;

when the error exceeds a predefined limiting value, compensating for the error by correcting the x, y address in the second coordinate system used for reading out the respective threshold value from each one of the plurality of the threshold value matrices;

obtaining comparison results by comparing the respective threshold value read-out from each one of the plurality of the threshold value matrices with an associated color value from the continuous-tone image; and based on the comparison results, selecting one of the plurality of the printing values for the device pixel.

2. The method according to claim 1, which comprises using random numbers to modify x, y addresses in the second coordinate system that have been corrected.

3. The method according to claim 2, which comprises adding the random numbers to the x, y addresses in the second coordinate system that have been corrected.

4. The method according to claim 2, which comprises using random numbers to vary locations in the second coordinate system, at which the x, y addresses in the second coordinate system are corrected.

5. The method according to claim 2, which comprises before applying a new one of the random numbers, reversing an influence of a preceding one of the random numbers.

6. A method for digitally screening a continuous-tone image with a first screen having any desired screen resolution and any desired screen angle, the method which comprises:

assigning a first coordinate system having x,y addresses to the first screen;

assigning a second coordinate system having x,y addresses to a second screen having a given screen resolution and a given screen angle;

providing printing values, representing at least one screen dot of the second screen, as printable values of a multistage printing process for device pixels associated with image points of the continuous-tone image being screened;

storing the printing values in a plurality of printing-value matrices;

associating each possible tonal value stage of color values with a respective one of the plurality of the printing-value matrices;

for an image point, addressing each one of the plurality of the printing-value matrices with an x, y address in the second coordinate system, and then reading out a respective printing value for a device pixel associated with the image point from each one of the plurality of the printing-value matrices while determining an error between the x, y address in the second coordinate system and a corresponding x, y address in the first coordinate system;

when the error exceeds a predefined limiting value, compensating for the error by correcting the x, y address in the second coordinate system used for reading out the respective printing value from each one of the plurality of the printing-value matrices; and for screening a color value associated with the image point and belonging to a respective printing value read-out, selecting a printing-value matrix associated with a tonal value stage corresponding to the color value associated with the image point.

7. The method according to claim 6, which comprises using random numbers to modify x, y addresses in the second coordinate system that have been corrected.

8. The method according to claim 7, which comprises adding the random numbers to the x, y addresses in the second coordinate system that have been corrected.

9. The method according to claim 7, which comprises using random numbers to vary locations in the second coordinate system, at which the x, y addresses in the second coordinate system are corrected.

10. The method according to claim 7, which comprises before applying a new one of the random numbers, reversing an influence of a preceding one of the random numbers.

* * * * *